United States Patent [19]

Niehaus et al.

[11] Patent Number: 4,835,738
[45] Date of Patent: May 30, 1989

[54] REGISTER STACK FOR A BIT SLICE PROCESSOR MICROSEQUENCER

[75] Inventors: Jeffrey A. Niehaus, Dallas; John W. Kronlage, Richardson, both of Tex.

[73] Assignee: Texas Instruments Incorporated, Dallas, Tex.

[21] Appl. No.: 846,673

[22] Filed: Mar. 31, 1986

[51] Int. Cl.$^4$ .......................... G06F 9/22; G06F 12/00
[52] U.S. Cl. .................................................... 364/900
[58] Field of Search ...................... 364/200, 900, 736

[56] References Cited

U.S. PATENT DOCUMENTS

| | | | |
|---|---|---|---|
| 3,297,999 | 1/1967 | Shimabukuro | 364/200 |
| 3,903,509 | 9/1975 | Picandet | 364/900 |
| 4,099,229 | 7/1978 | Kander | 364/200 |
| 4,398,244 | 8/1983 | Chu et al. | 364/200 |
| 4,481,608 | 11/1984 | Berkowitz | 364/900 |
| 4,504,925 | 5/1985 | Gilhousen | 364/900 |
| 4,553,203 | 11/1985 | Rau et al. | 364/900 |
| 4,603,384 | 7/1986 | Brantingham et al. | 364/200 |
| 4,628,477 | 12/1986 | Burrows | 364/900 |
| 4,740,914 | 4/1988 | Abrant et al. | 364/900 |

FOREIGN PATENT DOCUMENTS 54-142946 11/1979 Japan .

OTHER PUBLICATIONS

"32 Bit Supermini Built with Bit-Slice IC Family", by Jeff Niehaus, Electronic Design, May 20, 1983, pp. 139-146.

"Chip Set Eases Bit-Slice Design While Tackling Video-Speed Processing", Jeff Niehaus et al., Electronics, Oct. 20, 1983, pp. 133-138.

"Advanced Schottky 8-bit-Slice Processor Components", Product Review Pamphlet, Texas Instruments Inc., 1982.

"Digital System Design with LSI Bit-Slice Logic", by Glenford J. Myers, (Pub. J. Wiley and Sons, Inc.), 1980, pp. 142-144; 149-150; 164-167; 174-177; 182-187; and 190-200.

Primary Examiner—Raulfe B. Zache
Assistant Examiner—Thomas C. Lee
Attorney, Agent, or Firm—Thomas R. FitzGerald; Leo N. Heiting; Melvin Sharp

[57] ABSTRACT

A microsequencer includes a memory array (110) which is interfaced with a push/pop register (100). Data is input to the push/pop register (100) through a multiplexer (104) and also to Read register (102). The stack comprised of the RAM (110) and the register (100) can be push or pop with control logic (120). Stack pointer (130) and Read pointer (134) are provided for storing the stack and read pointers. The Read register (102) allows reading of data independent of the contents of the push/pop register (100) and the Read pointer (134) allows independent reading of information in the RAM (110).

19 Claims, 5 Drawing Sheets

REGISTER STACK FOR A BIT SLICE PROCESSOR MICROSEQUENCER

TECHNICAL FIELD OF THE INVENTION

The present invention pertains in general to bit slice systems, more particularly, to the microsequencer register stack in the bit slice processor.

BACKGROUND OF THE INVENTION

A bit slice system provides a designer with the tools to customize a processor to the needs of a given application. The bit slice architecture utilizes a bit slice processor which is comprised of a microsequencer and an expanded bit slice arithmetic logic unit (ALU). The microsequencer is combined with a microprogram memrory and a microinstruction register to provide control codes for the bit slice ALU. This type of a processor is effectively a computer for disposal within a more sophisticated computer architecture. With the bit slice system, the designer can define the details of the system operation, including the instruction set to be implemented. This allows the designer to deviate from the preset instruction set which is common to most processors.

The bit slice ALU is a fundamental part of the system. This element is designed so that it can be connected to similar elements to provide an ALU of any desired word width. Central to the ALU slice is that its operation can be expanded to any number of bits by interconnection of like ALUs. For example, if any ALU with eight bits per circuit is utilized, four circuits would form the ALU for a thirty-two bit processor. The carry and shift lines provide communication between ALUs so that multiple bit arithmetic operations can be performed.

The microsequencer processes the instructions steps in a predetermined sequence and outputs control information to the remaining portions of the bit slice processor. The microsequencer has built-in storage space in the form of a register stack. This is typically a push/pop register stack which is accessible to read data therefrom or write data thereto. Stack pointers are provided to determine the last address in the register at which memory as extracted from or written to. These register stacks have some disadvantages in that retrieval of information therefrom can cause the contents of the stack to be disturbed. For example, if information is to be read from the stack, it is typically placed in the top register in the stack and read therefrom. This requires the stack to be positioned at such a point that the top register therein can be read. This may require an additional stack pointer register to store the previous pointer location. Additionally the contents of the register can be disturbed when an attempt is made to store too much data or to extract too much data from the stack. This results when the stack pointer is incremented too far in one direction or the other.

SUMMARY OF THE INVENTION

The present invention disclosed and claimed herein comprise a register stack for a microsequencer in a bit slice system. The register stack includes a memory array having a predetermined number of storage locations for storing data with an input for receiving data to be stored and an output for outputting access data. The storage locations are arranged in a queue and accessible in a last in, first out format. A push/pop register is provided at the input of the memory array to provide one storage location for receiving data. A first output from the push/pop register is interfaced with the input of the memory array and a second output is interfaced with the output of the device to provide output data. A read register provides one storage location having the input for receiving data and an output for outputting data read from the register stack. A multiplexer is provided for selecting between the output of the memory array or received input data for output to both the read register and the push/pop register for storage therein. Control circuitry is provided for controlling the multiplexer to receive input data and store it in the push/pop register on the top of the queue and for outputting data from the top of the queue through the push/pop register such that the top of the queue is always in the push/pop register. A read control circuitry is provided for maintaining data in the queue and outputting data from the push/pop register and the memory array at any position in the queue without disturbing the contents of the push/pop register.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Bit Slice Processor Operation

Figure 1:
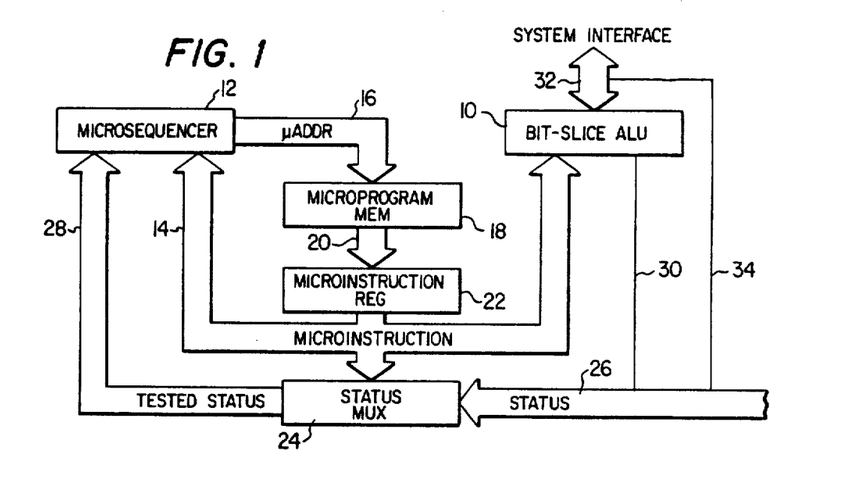
FIG. 1 illustrates a schematic block diagram of a bit slice processor.

With reference to FIG. 1, there is illustrated a schematic block diagram of a bit slice processor which is part of an overall bit slice system (not shown). The bit slice processor consists primarily of a bit slice ALU 10 and a microsequencer 12. These two elements operating in conjunction form a microprogrammed processor which operates in the background of a main memory processor program (not shown). The main program consists of the same type of macroinstructions that any processor executes. The microprogram is stored in the microsequencer 12 and is operable to control each element within the processor to determine the particular sequence of instructions that are carried out. The microprogram is primarily directed toward elemental details of each type of ALU operation, memory reference, and I/O operation on a step-by-step basis.

To fetch and execute a single macroinstruction from main memory (the task of every processor), the bit slice processor must execute two or more sequences of microinstructions from the microprogram stored in the microsequencer 12. First, it executes a sequence of microinstructions to perform the instruction fetch and decode operations. Then, it executes the appropriate sequence of microinstructions that will implement the macroinstruction.

The microsequencer 12 and bit slice ALU 10 are interfaced with the microinstruction bus 14 which is a uni-directional bus. In addition, the microsequencer 12 outputs a microaddress on a microaddress bus 16 to a microprogram memory 18. The microprogram memory 18 has stored therein the microinstructions, which are output on a bus 20 to a microinstruction register 22 for storage therein. The microinstruction register 22 is interfaced on the output thereof with the microinstruction bus 14.

A status multiplexer 24 is provided for interfacing between the microinstruction bus 14 on one input and a status bus 26 on another input. The output of the status multiplexer 24 is a tested status bus 28 which is input to the microsequencer 12 to provide status information. The status bus 26 receives a status input from the ALU on lies 30. The bit slice ALU 10 interfaces with a system interface bus 32 which also interfaces with the status bus 26 through lines 34.

In operation, the bit slice ALU 10 is connected to the system interface bus 32 since this block performs all data and address manipulations. The status information of the bit slice ALU 10 is interfaced with the microsequencer 12 so that the microsequencer can implement any needed conditional branch or jump operations by the output of appropriate microinstructions. The control lines that define the operation of the bit slice ALU 10 must come from the microinstruction bus 14 since it defines what operation each element of the system is peforming at each point in time.

The control code for the bit slice ALU 10 makes up part of the microinstruction code, or microcode for short. Another part of the microcode must define the memory and input/output operations, such as memory read, memory write, input Read and output Write, that are to occur. The number of bits that must be devoted to the ALU control code and the memory control code depends on the ALU bit slice function code length, and the number of memory input/output control signals that need to be generated. As described above, the microprogram memory 18 contains all of the microcode with the microinstruction register 22 holding the microcode for the microoperation that is currently being performed.

The microsequencer 12 determines which microinstruction is to be executed next, and must send this address to the microprogram memory 18. Normally, the next instruction is located immediately after the current instruction being executed, just as it is in the main computer program in main memory. Thus, the sequencer usually adds one to the present microaddress to get the next microaddress. In some cases, the microsequencer 12 must perform a branch or subroutine jump within the microprogram. The address for a jump to the next microinstruction to be executed must come from either the current microinstruction, or it must be an address generated as a result of the main instruction code or an interrupt condition. The branch address is generated by either a portion of the microcode and the microinstruction register 22, or it is generated by an internal interrupt vector circuit (not shown). The microsequencer 12 is therefore instructed as to whether to execute a branch, a subroutine jump, a subroutine return, or simply increment to the next microinstruction address in the microprogram memory 18.

Microsequencer

Figure 2:
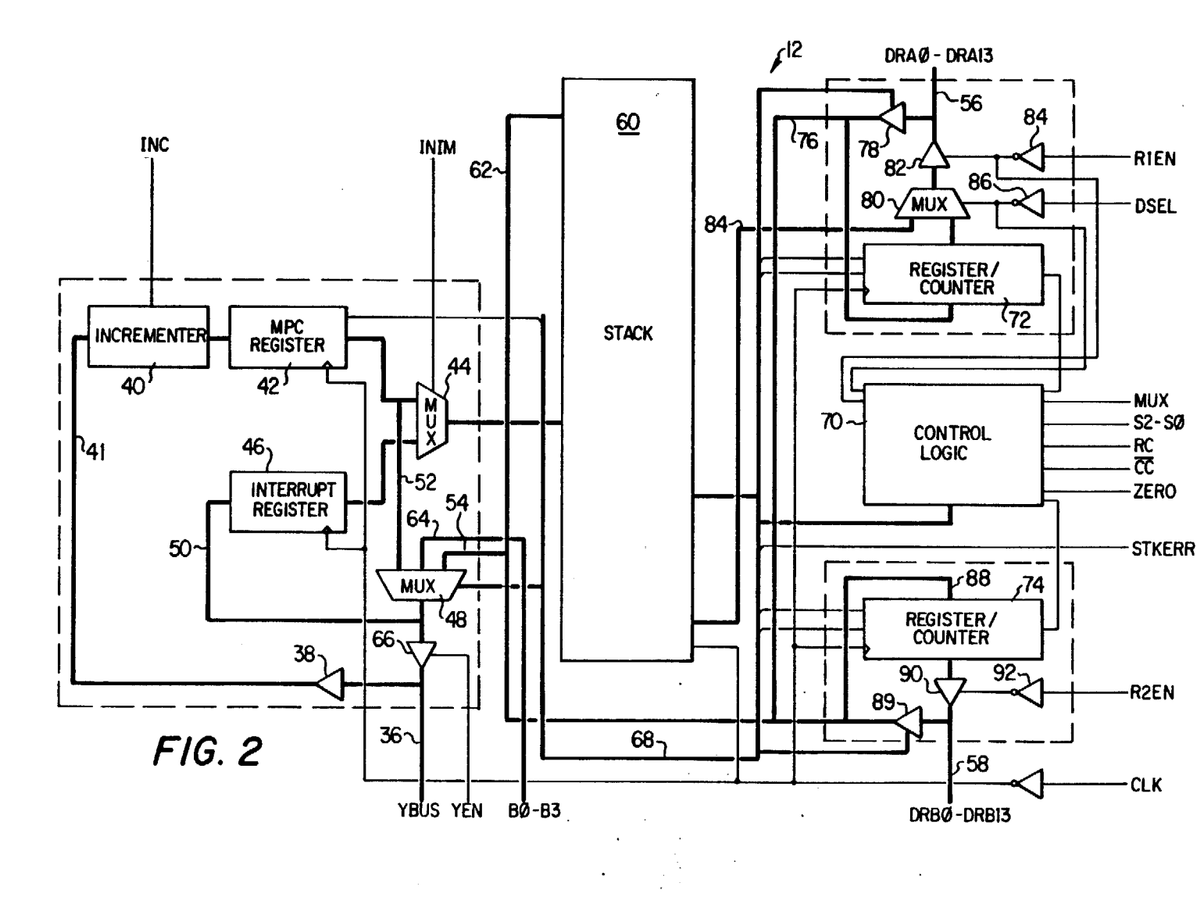
FIG. 2 illustrates a schematic block diagram of a microsequencer.

Referring now to FIG. 2, there is illustrated a schematic block diagram of the microsequncer 12. Data is input to the microsequencer on a Y-bus 36 to a buffer 38. The output of the buffer 38 is connected to the input of an incrementer 40 on a bus 42, the incrementer 40 is controlled by an external INC signal to increment information therethrough. The output of the incrementer 40 is input to a microprogram counter/register (MPC register) 42. The MPC register 42 stores the microprogram information. The output of the MPC register 42 is input to one input of an interrupt multiplexer 44. The multiplexer 44 is controlled by an external interrupt signal INT.

The other input of the multiplexer 44 is connected to the output of an interrupt register 46. The input of the interrupt register 46 is connected to the output of a multiplexer 48 thorugh a bus 50. The multiplexer 48 is the Y-output multiplexer and controls address selection. Addresses can be selected from a number of sources. When the input on multiplexer 48 is connected to the output of the MPC register 42 through a bus 52, it is used for Repeat and Continue instructions. One input is also connected to a bus 54 which provides address information from a DRA address bus 56 and DRB address bus 58 and also from the output of a register stack 60 on a bus 62. Additionally, the multiplexer 48 has one input thereof interfaced with a four-bit B-bus 64, which contents can replace the four least significant bits of the address received from the DRA bus 56 and DRB bus 58 to support 16-way and 32-way branches. The output of multiplexer 48 is connected to the Y-bus 36 through a buffer 66.

A control bus 68 is provided which is interfaced with multiplexer 48, MPC register 42 and register stack 60. The control bus 68 is interfaced with a control logic circuit 70 for providing control functions for microsequencer 12. A register/counter 72 and a register/-counter 74 are provided for intnerfacing with the A and B addresses on the DRA bus 56 and DRB bus 58, respectively. The register/counters 72 and 74 allow addresses or loop counts to be loaded directly thereto through the buses 56 and 58. The value stored in these registers may either be held, decremented or a new value loaded. Independent control of both registers during a single cycle is supported with the exception of a simultaneous decrement of both registers.

Register/counter 72 has the input thereof connected to a bus 76, bus 76 being connected to bus 54 on multiplexer 48. Bus 76 is also connected to the output of a grated buffer 78, the input of which is connected to the DRA bus 56. The output of register/counter 72 is connected to the input of a multiplexer 80, the output of which is connected to DRA bus 56 through a gated buffer 82. The input of multiplexer 80 is connected to the Read output of the register stack 60 through a bus 84. The gate 82 is controlled by an enable signal RIDEN through an inverter 84 and also by a control signal from the control logic block 70. The multiplexer 80 is controlled by a select signal DSEL through an interverter 86 and also by a control signal from the control logic block 70.

The register/counter 74 has the input thereof connected through a bus 88 to the bus 76 and also to the output of a gate 88. The input of gate 88 is connected to the DRB bus 58. The output of register/counter 74 is connected to the DRB bus 58 through a grated buffer 90. The gated buffer 90 is controlled by a signal R2DEN through an inverter 92.

Controlling data signals which commonly originate from the microinstruction and from other hardware sources include the INC signal, which determines whether to increment the microprogram counter in the MPC register 42, and the addresses on the DRA bus 56 and DRB bus 58 which are used to load or read loop counter and/or next addresses. The microsequencer will not increment the address if the control signal INC is off, allowing wait states, and then repeats until flag instructions are to be implemented. If the control signal INC originates from status, the MPC repeats until flag instructions are possible. Another control signal is provided to permit test and branch instructions. This is the conditional code (CC) control signal. However, this must not be asserted under microprogram control to implement other instructions such as continue or loop. This signal will normally be generated by the output of a status multiplexer. In this case, whether the CC signal is to be forced high, forced low or taken from ALU status will be determined by a status multiplexer select field in the microinstruction.

Control signals are also generated from hardware attached to the B-bus 64 and can be used as a four-bit variable to support 16- and 32-way branches. A Y-enable signal (Y-EN) controls the gated buffer 66 to allow interrupt hardware to place an address on the bus 42. Status is provided by the ZERO output which is set at the beginning of the cycle in which either of the register/counters 72 or 74 will decrement to ZERO. There is also a stack warning signal (STKERR) set up at the beginning of the cycle in which the bottom of the stack is read, or in which eight of nine locations is written. In the latter case, STKERR remains high until the stack pointer is decremented to seven.

The Y-bus 36 generates the next address in the microprogram. Usually the incrementer 40 adds one to the address on the Y-bus 36 to compute the next address plus one. The next address plus one is then stored in the microprogram register 42 at the beginning of a subsequent instruction cycle. During the next instruction, this "continue" address will be ready at the Y-output multiplexer 48 for possible selection as the source of the subsequent instruction. The incrementer 40 thus looks two addresses ahead of the address and instruction register to set up a Continue (increment by one) or Repeat (no increment) address.

Selecting the INC from status is a convenient means of implementing instructions that must repeat until some condition is satisfied; for example, shift the ALU until the most significant bit is equal to one or decrement the ALU until the most significant bit is equal to zero. The microprogram counter in the MPC register 42 is also a standard path to the stack 60. The next address is pushed onto the stack during a subroutine Call, so that the subroutine will return to the instruction following that from which it was called.

The register stack 60 is a positive edge trigered 14-bit address stack that allows up to nine levels of nested calls or interrupts and can be used to support branching and looping. The stack 60 has an internal stack pointer and read pointer to allow reading of data in the stack without altering the stack pointer. A reset function is provided which pulls all the Y-outputs low and clears the stack pointer and read pointer. A clear function is also provided which sets the stack pointer and read pointer to zero. A "pop" operation causes the stack pointer to be decremented wherein a "push" operation allows the contents of the MPC register 42 to be placed onto the stack and the stack pointer incremented. A read operation is provided which makes the address pointed to by the read pointer available at the DRA bus 56. A hold operation is also provided which causes the address of the stack and read pointers to remain unchanged.

In general, the stack pointer operates as an up/down counter which increments whenever a push operation occurs and decrements whenever a pop operation occurs. Although push and pop are two operations, both events are accomplished within a single cycle. The read pointer on the other hand is provided as a tool for debugging micro-coded systems. It permits a non-destructive, sequential read of the stack contents from the DRA bus 56. This capability provides a user with a method of backtracking through the address sequence to determine the cause of overflow without effecting program flow, the status of the stack pointer or the internal data of the stack.

A stack warning operation is provided which alerts the system to a potential stack overflow or underflow condition. The stack error output STKERR becomes active under two conditions. If seven of the nine stack locations (0-8) are full, the stack pointer is at seven and a push occurs, the STKERR output will produce a high level signal to warn that the stack is approaching its capacity and will be full after one more push. Knowledge that overflow potential exists allows bit-slice-based systems to continuously process realtime interrupt vectors. This signal will remain high if hold, push or pop instructions occur, until the stack pointer is decremented to seven. Shoud a push instruction occur when the stack is full, the new address will be written over the address in the stack location eight. The user may be protected from attempting to pop an empty stack by monitoring the STKERR output before pop operations. A high level at this pin signifies that the last address has been removed from the stack. This condition remains until an address is pushed onto the stack and the stack pointer is incremented to one.

Register Stack

Figure 3:
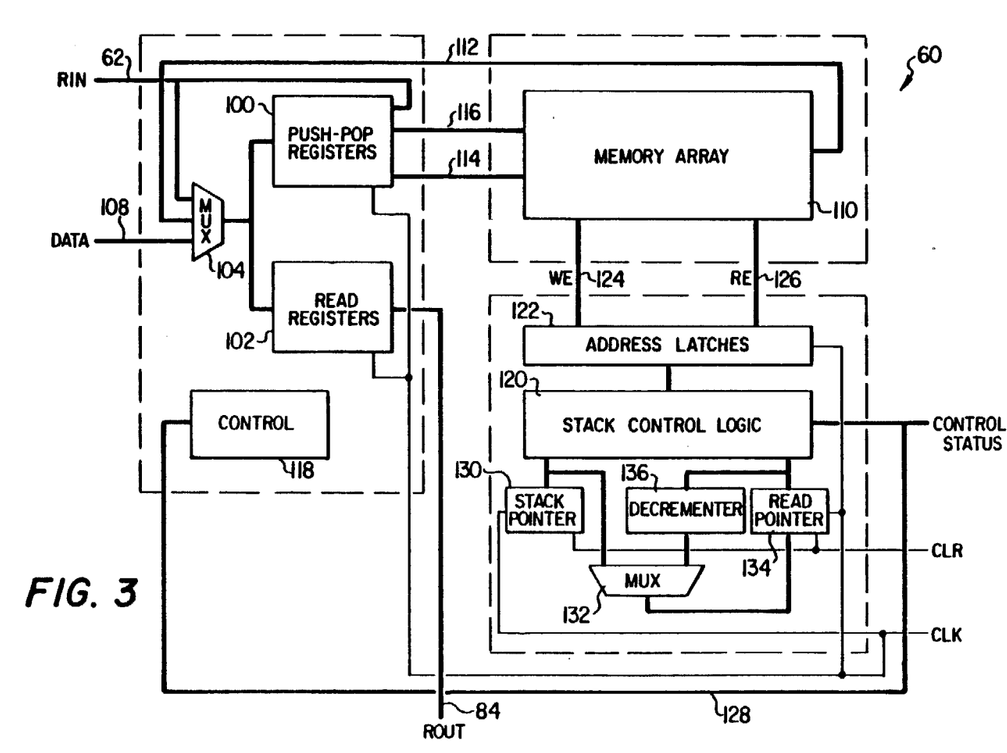
FIG. 3 illustrates a schematic block diagram of the register stack in the microsequencer.

Referring now to FIG. 3, there is illustrated a schematic block diagram of the register stack 60 of FIG. 2, wherein like numerals refer to like parts in the various FIGUREs. A push-pop register 100 and a read register 102 are provided which both have the inputs thereof connected to the output of a multiplexer 104. The multiplexer 104 has one input thereof connected to the output of multiplexer 44 through bus 108 and one input thereof connected to the bus 62. A memory array RAM 110 is provided and has the output thereof connected to the input of multiplexer 104 through a bus 112. The input of the RAM 110 is connected to the output of the push/pop register 100 through a data bus 114 and an inverted data bus 116. The push/pop register 100 and RAM 100 provide a 9×14 register stack. The push/pop register 100 is also interfaced with the bus 62.

The read register 102 has the outputs thereof connected to the bus 84 which is input to multiplexer 80 and interfaced with the DRA bus 56 to allow addresses to be output thereon, as described above. Data is output from RAM 110 on bus 112 to multiplexer 104 for storage in read register 102. Although multiplexer 104 is illustrated as being a single multiplexer, it is actually a dual-multiplexer. A control circuit 118 is provided for controlling an operation of the read register 102, push-/pop register 100 and multiplexer 104.

The RAM 110 is controlled by stack control logic 120. The stack control logic 120 controls address latches 122 which output Write Enable (WE) signals on a bus 124 to the RAM 110 and Read Enable signals (RE) on a bus 126 to RAM 110. The stack control logic 120 is interfaced with the control circuit 118 through a bus 128.

A stack pointer 130 is provided which is an up/down counter and has the output thereof interfaced with the stack control logic 120. The stack pointer 130 is also input to a multiplexer 132. A read pointer 134 is provided which has the output thereof input to the stack interfaced with the stack control logic 120 and also connected to the output of multiplexer 132. The output of the read pointer 134 is also input to a decrementer circuit 136, the output of which is connected to the other input of the multiplexer 132.

The stack pointer 130 is operable to count up or count down from the previous reading whereas the read pointer 134 can be loaded from the stack pointer at the top of the stack and then be decremented down by decrementer 136. Upon the next operation with the stack pointer, the read pointer 134 can again be loaded with the value of the stack pointer at the top of the stack. This allows the read register to always be referenced to the top of the stack for loading of stack information in read register 102.

In operation, the multiplexer 104 is controlled in a push operation to load data into the push/pop register 100 at the top of the stack. Each time data is pushed into push/pop register 100, the previous data is stored in RAM 110 and the stack pointer incremented up by one. In a pop operation, information is output on bus 112 to the input of multiplexer 104 for loading into the push-/pop register 100 and the stack pointer decremented by one. This information is then output on bus 62 for input to either the register/counter 72 or the register/counter 74. In a push/pop operation, the stack pointer 130 is moved up or down and the read pointer 134 is loaded with the stack pointer value and then decremented by decrementer 136 to the read value. This value is read out of RAM 110 onto bus 112 for input to multiplexer 104 (to read register 102). The read pointer 134 can then be decremented to sequentially read out the contents of the stack in a non-destructive mode. It is important to note that push/pop register 100 is not utilized, and therefore, the information at the top of the stack is not destroyed.

In the head operation, the first address read from the stack is the contents of the read register 102. This address is identical to that stored in push/pop register 100 since loading of push/pop register 100 is concurrent with loading of read register 102 with the same information. Thereafter, the decrementer 136 decrements read pointer 134 and the RAM 110 outputs information for loading only to read register 101. Note that bus 62 is input to multiplexer 104 to allow the contents of the push/pop register 100 to be loaded into the read register 102.

Figure 4:
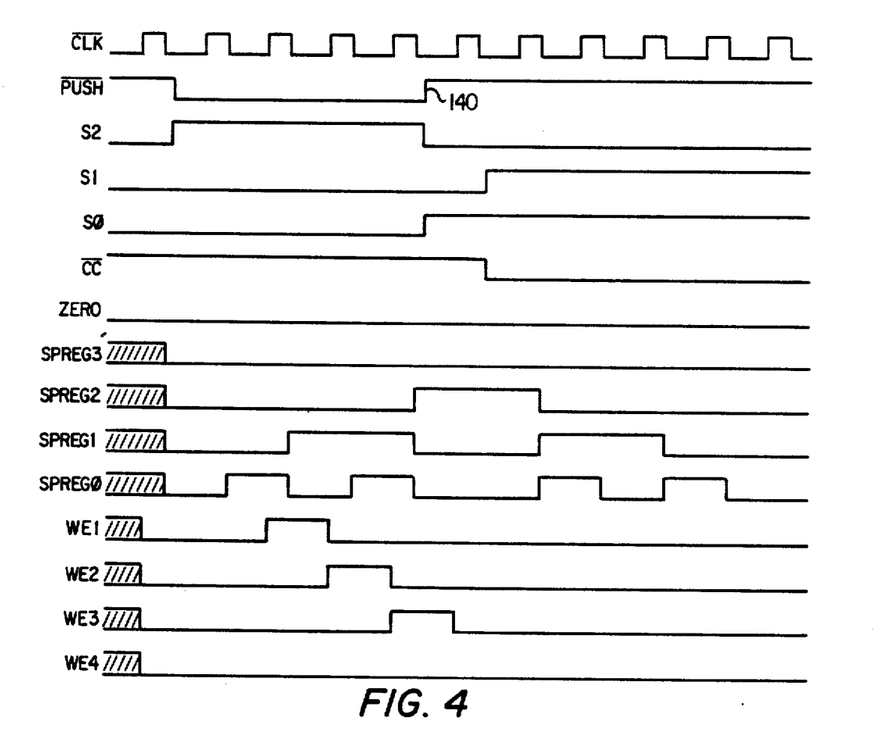
FIG. 4 illustrates the timing diagrams of the push/pop register stack.

Referring now to FIG. 4, there is illustrated timing diagrams for the push and pop operations of the register stacks 60 of FIG. 3. The system is synchronized with a clock signal CLK, with a push signal PUSH utilized to control the operation of push or pop. A low condition on the PUSH results in a push operation and a high logic level results in a pop operation. The stack is controlled by a stack control signals SO-S2 and also the condition code CC and ZERO. These push, pop or hold stack operations occur in parallel with various branching operations. A subroutine call is accomplished by combining a branch and a push, while return results from coding a branch to stack with a pop. The control operations are listed in Table 1 as follows:

| STACK CONTROL S2-S0 | Stack Control | | | |
|---|---|---|---|---|
| | | STACK OPERATION | | |
| | | CC = L | | |
| | 0SEL | ZERO = L | ZERO = H | CC = H |
| LLL | X | Reset/Clear | Reset/Clear | Reset/Clear |
| LLH | X | Clear SP/RP | Hold | Hold |
| LHL | X | Hold | Pop | Pop |
| LHH | X | Pop | Hold | Hold |
| HLL | X | Hold | Push | Push |
| HLH | X | Push | Hold | Hold |
| HHL | X | Push | Hold | Push |
| HHH | H | Read | Read | Read |
| HHH | L | Hold | Hold | Hold |

Referring further to FIG. 4, it can be seen that the stack control bits SO-S2 are changed at a transition 140 in the PUSH signal. The SPREG0-SPREG3 signals indicate the counting of the stack pointer 130 and it can be seen that the counter counts up to the transition 140 and then down. Additionally, the Write Enable signals WE1-WE4 illustrate writing only during the up count in the push operation and No-Write Enables are generated during the count down or pop operation.

Figure 5:
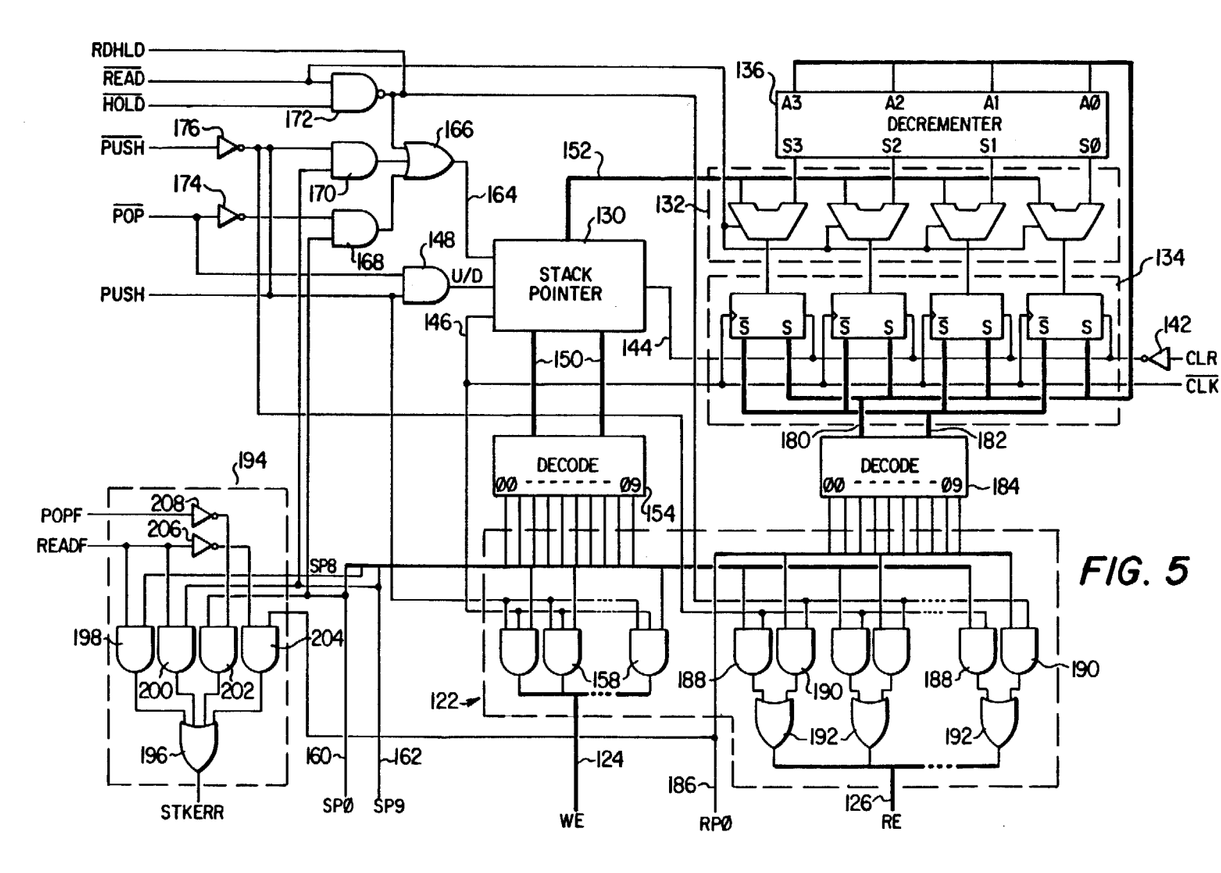
FIG. 5 illustrates a schematic block diagram of the register stack control.

Referring now to FIG. 5, there is illustrated a schematic diagram of the control portion of the register stack, wherein like numerals refer to like parts in the various FIGUREs. The stack pointer 130 is a four-bit up-down counter having a clear input connected to a clear signal through an inverter 142 to provide an inverted clear signal on a line 144. An inverted clock signal is received on a clock line 146 with an up-down (U/D) control received from the output of an AND gate 148. Latched data is provided on inverted and non-inverted outputs 150 and unlatched outputs are provided on a bus 152. The latched ouptuts on buses 150 are input to a decoder 154. The output of the four-bit counter 130 is a four-bit output and the decoder 154 provides ten outputs which are input to the address latch 122.

The output of decoder 154 is associated with the write enable bus 124, the Write Enable signal selected by eight three-input AND gates 158 which have the stack pointer outputs input thereto with SPO being output on a line 160 and SP9 being output on a line 162. Each of the NAND gates 158 have one input thereof connected to the PUSH signal which is also input to one input and AND gate 148, a second input connected to the clock signal line 148 and a third input thereof connected to one of the outputs of decoder 154. The stack pointer 130 is controlled by a control signal on line 164 which is connected to the output of the three-input OR gate 166, the inputs of OR gate 166 connected to the output of AND gate 168, AND gate 170 and a NAND gate 172, respectively. AND gate 168 has one input thereof connected through an inverter 174 to the inverted POP signal and the other input thereof connected to the SPO signal on line 160. AND gate 170 has one input thereof connected through inverter 176 to the inverted PUSH signal and the other input thereof connected to the SP9 output on line 162. NAND gate 172 has one input thereof connected to the inverted READ signal and the other input thereof connected to the inverted HOLD signal. The output of NAND gate 172 also provides the RDHLD signal.

The multiplexer 132 is comprised of four individual multiplexers connected on one input thereof to the bus 152 with the other input thereof to the output of a decrementer 136. The output of the multiplexers in multiplexer 132 are connected to the input of the four-bit read counter 134 which is comprised of four counters, each of the counters in the read counter 134 associated with each of the multiplexers in multiplexer 132. The four counters in the read counter 134 provide an inverted output on a bus 180 and a non-inverted output on a bus 182 for input to a decoder 182. The decoder 184 is similar to the decoder 154 and provides read pointer outputs RP0-RP9. The output RPO is output on a line 186. The outputs RP2-RP9 are input to the Read Enable portion of the address latches 122. The Read Enable of the address latches 122 is comprised of a logic circuit associated with each of read pointer outputs RP2-RP9. Each of these circuits is comprised of two AND gates 188 and 190 having outputs thereof connected to the inputs of an OR gate 192. The output of the OR gate 192 for each of the circuits is connected to the Read Enable bus 126. One input of AND 188 for each of the Read Enable circuits is connected to the output of the inverter 174 to receive the non-inverted POP signal with the other input thereof connected to one of the stack pointer outputs. The AND gate 190 in each of the Read Enable circuits has one input thereof connected to the output of AND gate 172 for the RDHLD signal and the other input thereof connected to one of the outputs of the decoder 184 to receive the associated READ pointers RP2-RP9.

A stack error circuit 194 is provided for outputting the stack error signal STKERR. The circuit 194 is comprised of a four-input OR gate 196 having four inputs thereof each connected to AND gates 198, 200, 202 and 204. One input of AND gate 204 is connected to the RPO signal on line 186 and the other input thereof is connected through an inverter 206 to a read fault signal READF. AND gate 202 has one input thereof connected to the SPO signal on line 160 and the other input thereof connected through an inverter 208 to the pop fault signal POPF. AND gate 200 has one input thereof connected to the SP3 signal 162 and the other input thereof connected to the READF signal. AND gate 198 has one input thereof connected to the SP8 output of decoder 154 and the other input thereof connected to the READF signal.

In operation, the stack error logic circuit 194 generates an active high on the STKERR output whenever the stack is empty, full or there is a read error. When the stack is empty, the stack pointer is zero and the pop operation is about to be done. AND gate 202 determines that a pop operation is to be performed in addition to the state of the SPO line. There are two full conditions, one determined the AND gate 198 and one determined by AND gate 200. AND gate 198 determines when the stack pointer output SP8 is present and a non-read operation is about to be done by sampling the non-inverted READF signal. AND gate 200 determines when the stack pointer is at the ninth position (SP9) and a non-read operation is about to be performed. The AND gate 204 determines when the read pointer is at zero and a read operation is about to be performed. This is a read error condition.

Figure 6:
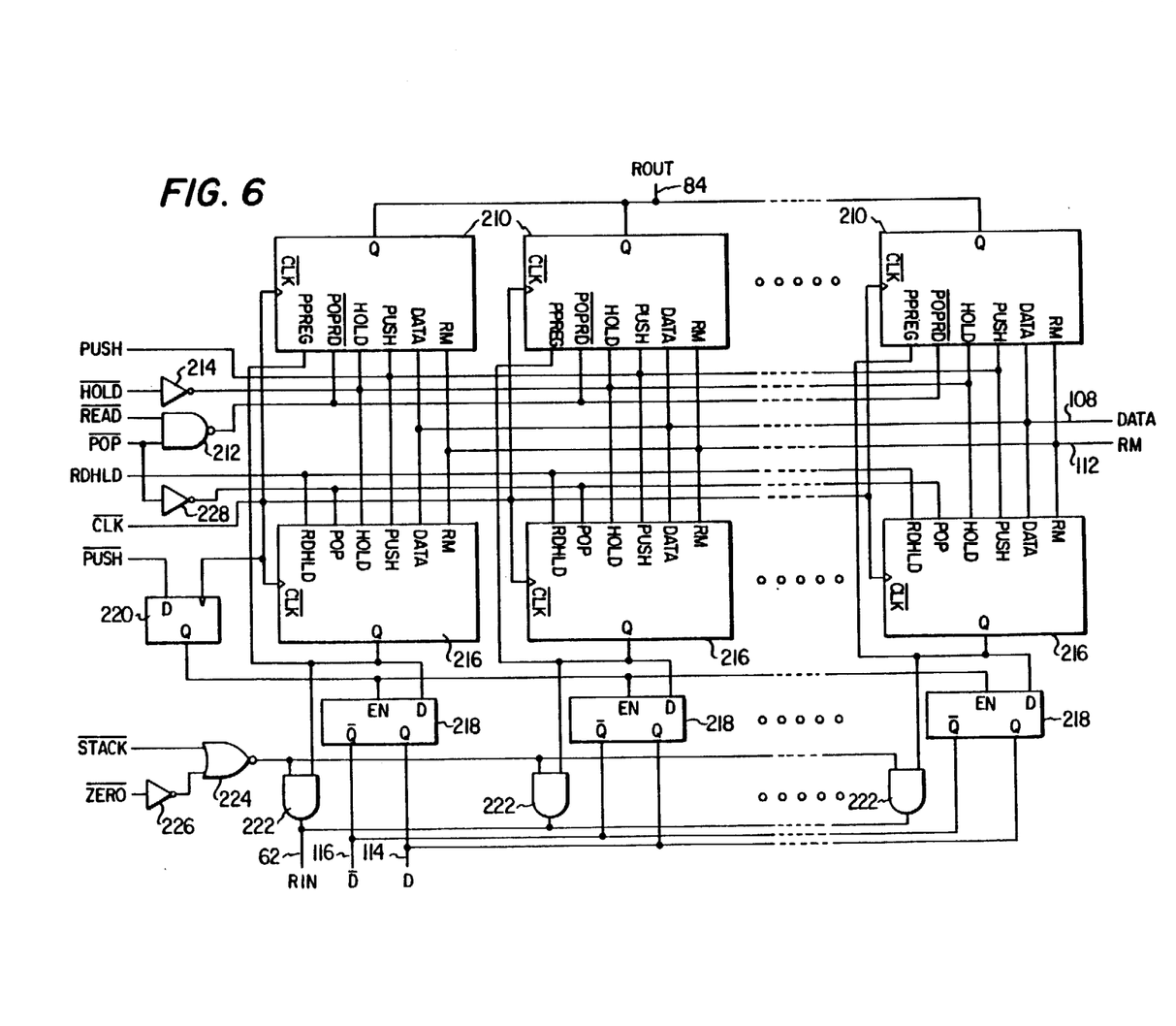
FIG. 6 illustrates a schematic block diagram of the push/pop register and read registers.

Referring to FIG. 6, there is illustrated a schematic block diagram of the push/pop register 100 and the read register 102 wherein like numerals refer to like parts in the various figures. The read register 102 is comprised of fourteen individual read registers 210. Each of the registers 210 have a clock input connected to the inverted clock signal and the PPREG input connected to the output of the push/pop register 100 a POPRDN input connected to the output of a NAND gate 212, a HOLD input connected to the inverted HOLD signal through inverter 214, a push input connected to the PUSH signal, a data input connected to the data bus 10 and RM input connected to the bus 112 for reading information in the memory. The outputs of each of the registers 210 is connected to one of the fourteen lines on bus 84.

The push/pop register 100 is comprised of fourteen individual push/pop flip flops 216. Each of the flip flops 216 receives the inverted clock input, the PUSH signal, the POP signal, the HOLD signal and the RDHLD signal. Additionally, the data input is connected to the bus 108 and a RM input is connected to the bus 112. The output of each of the individual flip flops 216 is connected to the data input of a latch 218, each of the flip flops 216 having a latch 218 associated therewith. The latch 218 has an enable input connected to the output of a D-flip-flop 220, the input of which is connected to the inverted PUSH signal and the clock input of which is connected to the inverted clock signal. The inverted output is connected to the inverted data bus 116 and the non-inverted output is connected to the bus 114. The output of each of the flip flops 216 is also connected to one input of an AND gate 222, the other input of which is connected to the output of NOR gate 224. The output of NAND gates 222 are connected to the bus 62. NOR gate 224 has one input thereof connected to the inverted STACK signal and the other inputs thereof connected through an inverter 226 to the inverted ZERO signal. The NAND gate 212 has one input thereof connected to the inverted READ signal and the other input thereof connected to the inverted POP signal. The inverted POP signal is connected to the POP input of the flip flops 216 through an inverter 228.

The individual read register 210 is comprised of three AND gates having the output thereof connected to input of an OR gate which is connected to the input of a latch. The latch is clocked by the inverted clock signal. The PPREG signal and the HOLD signal are input to one AND gate, the POPRD signal and the RM signal are input to one AND gate and the PUSH and DATA signal are input to the third AND gate. Therefore, the HOLD, POPRD and PUSH signals are enabling signals to allow the data to be passed therethrough to the latch. In a similar manner, the individual push/pop flip flops 216 are comprised of four AND gates having the output thereof connected to input of an OR gate which is input to a latch. The latch is clocked by the inverted clock signal. Two of the AND gates have one input thereof connected to the output to the output of the latch on the output of the flip flops 216 and one AND gate has one input thereof connected to the RDHLD signal and the other AND gate has the other input thereof connected to the HOLD signal. The third AND gate has one input thereof connected to the PUSH signal and the other input thereof connected to the DATA signal. The fourth AND gate has one input thereof connected to the POP signal and the other input thereof connected to the RM signal.

In summary, there has been provided a register stack for a microsequencer in a bit slice processor. The register stack has a separate READ register and separate PUSH/POP register. The PUSH/POP register is operable to feed a random access memory for storage of data therein Control logic is provided to push or pop data into the stack where the stack pointer is provided for indicating the top of the stack. The separate read register reads data out of the stack without disturbing information in the push/pop register. The read register is controlled by a separate read pointer and is independent of this stack pointer. Additionally, stack error circuitry is provided to indicate whether the stack is full or empty or there is a read error.

Although the preferred embodiment has been described in detail, it should be understood that various changes, substitutions and alterations can be made therein without departing from the spirit and scope of the invention as defined by the appended claims.

What is claimed is:

1. A register stack, comprising:
   register stack means having n storage locations arranged in a queue for storing data and accessible in a last-in first-out format, said register stack means having:
   push/pop register means for providing one storage location at the top of said queue;
   memory array means having n-1 storage locations corresponding to the remaining storage locations of said queue; and
   access means for accessing the storage locations in said memory array in accordance with last-in first-out format of said queue to receive data from said push/pop register means for input to said memory array means and to output data from said memory array means to said push/pop register means in accordance with a last-in first-out format;
   push/pop control means opposites in a push mode to control said register stack means to receive new data and input said received data to said push/pop register means for storage therein and control said access means to store the previous contents of said push/pop register means in said memory array means in the next one of said storage locations in said memory means in accordance with said last-in first-out format, said push/pop control means operates in a pop mode to output stored data from said push/pop register means at the top of said queue and control said access means to output data from said memory array means from the last filled storage location therein for input to said push/pop register means;
   read register means for providing a single storage location; and
   read control means for interfacing the input of said read register means to said register stack means during a read mode to access the contents of said storage locations in said register stack means in accordance with the last-in first-out format independent of said push/pop control means for output from said read register means, said push/pop control means inhibited in the read mode such that the arrangement of said queue and the contents of said push/pop register means is not altered during the read mode.

2. The register stack of claim 1 wherein said read control means operates to interface the input of said read register means with the input of said push/pop register means when said push/pop register means has said received new data stored therein by said push/pop control means such that said read register means initially contains the contents in said register stack means at the top of said queue.

3. The register stack of claim 2 wherein said read control means in the read mode operates to sequentially decrement through the storage locations of said queue from the top of said queue in accordance with an external incrementing signal.

4. The register stack of claim 1 and further comprising means for determining the relative position of the storage locations in the register stack with respect to said first-in last-out queue and outputting an error signal if the last storage location corresponding to the last position constituting the bottom of the queue in the first-in last-out queue is to be accessed for output of data therefrom or the first position in the queue constituting the maximum capacity of the register stack is to be accessed for input of data thereto.

5. A register stack comprising:
   memory means having a predetermining number of storage locations for storing data therein and having an input for receiving data to be stored and an output for outputting accessed data;
   push/pop register means for providing one storage location and having an input for receiving data, a first output interfaced with the input of said memory means for outputting data thereto and a second output for outputting data from the register stack;
   said push/pop register means and said storage locations in said memory means arranged in a first-in last-out queue format such that said push/pop register means comprises the top position in said queue;
   read register means for providing one storage location having an input for receiving data and a read output for outputting data from the register stack;
   multiplex means for selecting between the output of said memory means and a data input terminal for either receiving new input data for input to said push/pop register means and said read register means or for receiving output data from said memory means for input to said push/pop register means and said read register means;
   push/pop control means for controlling said multiplex means in a push mode to receive new data from said data input terminal for input to said read register means and said push/pop register means with said memory means controlled to store the previous contents of said push/pop register means in the next of the storage locations in said memory means corresponding to the next location in said first-in last-out queue, said push/pop control means operable in a pop mode to control said push/pop register means and said memory means to output the contents of said push/pop register means and to input data from said memory means for storage in said push/pop register means from the storage location in said memory means corresponding to the highest position in said first-in last-out queue in said memory means; and
   read means for accessing said memory means in a read mode and controlling said multiplex means to input data to said read register means for storage therein, the contents of said push/pop register means and the arrangement of said first-in last-out queue remaining unchanged such that accessing of said memory means by said read means does not change said queue, said push/pop control means inhibited from operating in the push or pop mode during the read mode.

6. The register stack of claim 5 wherein said push/pop control means comprises:

a stack pointer for storing a value that corresponds to the relative position of the storage locations in said memory means and said push/pop register means relative to said first-in last-out queue, said stored value defining the one of said storage locations corresponding to the top of said first-in last-out queue;

stack counter means for incrementing said stack pointer in the push mode each time the contents of said push/pop register means are output to said memory means and decrementing said stack pointer in the pop mode when new data is received and stored in said push/pop register means;

access means for accessing the storage locations in said memory means in accordance with the value in said stack pointer, the storage locations in said memory means arranged in a predetermined order with one location corresponding to each value output by said stack pointer; and multiplex control means for controlling said multiplex means in the push mode to input said received data to said push/pop register means and store the previous contents of said push/pop register means in the accessed one of the storage locations in said memory means and, in the pop mode, to control said multiplex means to store the contents of the accessed storage location in said memory means in said push/pop register means.

7. the register stack of claim 6 wherein said read control means comprises:

a read pointer for storing a value that corresponds to the relative position of the storage locations in said memory means and said read register means relative to said first-in last-out queue;

means for loading said read pointer with the contents of said stack pointer at the beginning of a read operation;

read counter means for decrementing said read pointer in a read mode in response to an external decrement signal; and means for controlling said access means in said push/pop control means to access the storage location in said memory means in accordance with the value in said read pointer; and means for controlling said multiplex means to input said read register means the output of the accessed storage location in said memory means without disturbing the contents of said push/pop register means or the value in said stack pointer.

8. The register stack of claim 6 and further comprising means for determining if the value in said stack pointer is at a maximum value corresponding to the maximum capacity of the register stack when said push/pop control means is in the push mode or the value of said stack pointer is at a minimum value corresponding to the bottom of said queue when said push/pop control means is in the pop mode and means for outputting a stack error signal when either the value of said stack pointer is at a maximum in the push mode or a minimum in the pop mode.

9. A first-in last-out register stack for a microsequencer, comprising:

memory circuitry having a plurality of storage location for storing instructions data words, said memory circuitry having an input for receiving input instruction data words in a push mode for storage therein and an output for outputting stored instruction data words therefrom in either a pop mode or a read mode;

address circuitry for selecting one of said storage locations for storing data in the push mode or for outputting data in either the pop mode or the read mode in accordance with an address value;

stack pointer circuitry for generating said address value for input to said address circuitry in the push and the pop mode, with said address value defining the top of the register stack, said stack pointer cicuitry incrementing said address value in the push mode from a predetermined value defining the bottom of the register stack for each received instruction data word and decrementing said address value in the pop mode, said incrementing and decrementing operations performed in response to an external signal;

read pointer circuitry for accessing and storing from said stack pointer circuitry said address value defining the top of the stack and decrementing said stored address value in the read mode with the contents of said read pointer circuitry input to said address circuitry as said address value in the read mode; and control circuitry for controlling said register stack to operate either in the push mode or the pop mode and controlling said stack pointer circuitry in the push and the pop mode to generate said address value defining the top of the register stack, and controlling said read pointer circuitry to operate in the read mode while inhibiting said stack pointer circuitry in the read mode such that said address value generated by said stack pointer circuitry is stored in said read pointer circuitry during the read mode and decremented thereby without distributing the contents of said stack pointer in the read mode.

10. The register stack of claim 9 wherein said stack pointer circuitry comprises:

a stack pointer register for storing said address value;

means for generating said address value defining the top of said register stack for storage in said stack pointer register;

means responsive to said control circuitry being in the push mode to decrement said stored address value;

means responsive to said control circuitry being in the pop mode to increment said stored address value; and multiplex means responsive to said control circuitry being in the push or pop mode to output the contents of said stack pointer register to said address circuitry as said address value, and to said read pointer circuitry for storage therein.

11. The register stack of claim 10 wherein said read pointer circuitry comprises:

a read pointer register for storing said address value received from said multiplex means when said control means is in the push or pop mode; and means responsive to said control circuitry being in the read mode to decrement said stored address value;

said multiplex means responsive to said control circuitry being in the read mode to output the contents of said read pointer register to said address circuitry.

12. The register stack of claim 11 and further comprising error indication means for determining when said stored address value in either said read pointer register or said stack pointer register corresponds to an address value that indicates a stack position that is proximate the bottom of the stack or a stack position that is proximate the full capacity of said memory circuitry, said error indicator means outputting an error signal in response thereto.

13. The register stack of claim 9 wherein said memory circuitry comprises:

a memory array having n-1 storage locations where n is equal to the maximum number of storage locations in said memory circuitry, said memory array having an input for receiving instruction data words for storage therein and an output for outputting accessed instruction data words therefrom, said memory array selectible by said address circuitry and operates to store instruction data words received on the input thereof for each increment of said stack pointer circuitry and operable to output accessed instruction data words for each decrement of either said read pointer circuitry or said stack pointer circuitry;

a push/pop register having a single storage location with an input for receiving input instruction data words to the register stack, a first output for outputting accessed instruction data words from the stack and a second output connected to the input of said memory array for transferring previously stored instruction data words from said push/pop register to said memory array for storage therein; and multiplexer means for receiving input instruction data to the stack on one input thereof and for receiving instruction data words output by said memory array on a second input thereof and having an output connected to the input of both said push/pop register and said read register circuitry, said multiplexer means operable in response to said control circuitry being in either the push or the read mode to connect the output of said memory array to the input of said push/pop register and said read register circuitry, and operates when said control circuitry is in the pop mode to connect the received input instruction data words to the stack to the input of said push/pop register and said read register circuitry.

14. A first-in last-out register stack, comprising:

a queue of storage locations arranged in a first-in last-out format;

means for generating a stack pointer value to define the top position in the queue in which data is to be stored or accessed;

stacked pointer register for storing said stack pointer value;

first operation means for operating the register stack in a push mode when data is to be stored in said queue by incrementing said stack pointer value in said stack pointer register and storing data in the defined top storage location of said queue;

means for operating the register stack in a pop mode when stored data is to be output from the register stack by decrementing said stack pointer value in said stack register and accessing data from the defined top position in said queue;

a read pointer register;

means for storing the stack pointer value in said read pointer register when operating in the push or pop mode; and means for operating the register stack in a read mode to independently examine the contents of said queue by inhibiting operation in the push or pop mode and independently decrementing the value in said read pointer register and accessing data at the position in said queue defined by the value stored in said read pointer register, the stack pointer value remaining unchanged during the read mode.

15. The register stack of claim 14 and further comprising means for determining if the stack pointer value of the stored value in said read pointer register corresponds to the bottom storage location in said queue which constitutes the bottom of said queue in either the pop mode or the read mode and outputting a stack pointer error signal in response thereto.

16. The register stack of claim 15 and further comprising means for determining if the stack pointer value stored in said stack pointer register corresponds to the storage location in said queue which constitutes the uppermost storage location in the stack and the maximum capacity in the stack and outputting a stack pointer error signal in response thereto.

17. A method for accessing and storing data in a first-in last-out register stack, comprising:

providing a queue of storage locations arranged in a first-in last-out format;

generating a stack pointer value to define the top position in the queue in which data is to be stored or accessed;

operating the register stack in a push mode when data is to be stored in the queue by incrementing the stack pointer value and storing data in the defined top position of the queue;

operating the register stack in a pop mode when stored data is to be output by decrementing the stack pointer value and accessing data from the defined top position in the queue;

storing the stack pointer value in a read pointer register when operating in the push or pop mode; and operating the register stack in a read mode to independently examine the contents of the queue by inhibiting operation in the push or pop mode and independently decrementing the value in the read pointer register and accessing data in the position in the queue defined by the value stored in the read pointer register, the stack pointer value remaining unchanged during the read mode.

18. The method of claim 17 and further comprising determining if the stack pointer value or the stored value in the read pointer register corresponds to the bottom storage location in the queue which constitutes the bottom of the queue in either the pop mode or the read mode and outputting a stack pointer error signal in response thereto.

19. The method of claim 18 and further comprising determining if the stack pointer value corresponds to the storage location in the queue constituting the uppermost storage location in the stack and the maximum capacity in the stack and outputting a stack pointer error signal in response thereto.

* * * * *